(12) United States Patent
Lim et al.

(10) Patent No.: US 8,542,570 B2
(45) Date of Patent: *Sep. 24, 2013

(54) APPARATUS AND METHOD FOR TRANSCEIVING SIGNALS USING FRAME STRUCTURE IN WIRELESS COMMUNICATION SYSTEM

(75) Inventors: Dong Guk Lim, Anyang-si (KR); Han Gyu Cho, Anyang-si (KR); Sung Ho Moon, Anyang-si (KR); Jin Sam Kwak, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 419 days.

This patent is subject to a terminal disclaimer.

(21) Appl. No.: 12/870,429

(22) Filed: Aug. 27, 2010

(65) Prior Publication Data

US 2011/0051632 A1 Mar. 3, 2011

Related U.S. Application Data

(60) Provisional application No. 61/237,304, filed on Aug. 27, 2009.

(30) Foreign Application Priority Data

Jul. 6, 2010 (KR) .................. 10-2010-0064890

(51) Int. Cl.
*H04J 11/00* (2006.01)

(52) U.S. Cl.
USPC .......................................... 370/203; 370/476

(58) Field of Classification Search
USPC ................... 370/203–210; 375/260
See application file for complete search history.

(56) References Cited

U.S. PATENT DOCUMENTS

| 2008/0137562 | A1 | 6/2008 | Li et al. | |
| 2009/0067522 | A1 | 3/2009 | Kwak et al. | |
| 2009/0109960 | A1 | 4/2009 | Chen et al. | |
| 2010/0118806 | A1* | 5/2010 | Griot et al. | 370/329 |
| 2011/0244870 | A1* | 10/2011 | Lee | 455/444 |

* cited by examiner

Primary Examiner — Pao Sinkantarakorn
(74) Attorney, Agent, or Firm — Birch Stewart Kolasch & Birch, LLP (57) ABSTRACT

A method and apparatus for transceiving signals using a predetermined frame structure in a wireless communication system is provided. The apparatus includes a Radio Frequency (RF) unit for transceiving a signal through a frame according to the predetermined frame structure. The frame includes 5 subframes, the 5 subframe comprise type-1 subframes including 6 Orthogonal Frequency Division Multiplex Access (OFDMA) symbols and type-2 subframes including 7 OFDMA symbols, and a Cyclic Prefix (CP) length of the frame corresponds to ⅛ of an effective symbol length.

15 Claims, 7 Drawing Sheets

APPARATUS AND METHOD FOR TRANSCEIVING SIGNALS USING FRAME STRUCTURE IN WIRELESS COMMUNICATION SYSTEM

Pursuant to 35 U.S.C. §119(e), this application claims the benefit of priority to Provisional Application No. 61/237,304, filed on Aug. 27, 2009.

Pursuant to 35 U.S.C. §119(a), this application claims the benefit of priority to Korean application No. 10-2010-0064890, filed on Jul. 6, 2010.

BACKGROUND OF THE INVENTION

1. Field of the Invention

The present invention relates to a wireless communication system, and more particularly, to an apparatus and method for transmitting and receiving signals using a frame structure in a wireless communication system.

2. Discussion of the Related Art

An Institute of Electrical and Electronics Engineers (IEEE) 802.16m system supports both a Frequency Division Duplex (FDD) scheme, including a Half-Frequency Division Duplex (H-FDD) Mobile Station (MS) operation scheme, and a Time Division Duplex (TDD) scheme.

The 802.16m system uses an Orthogonal Frequency Division Multiplex Access (OFDMA) scheme as a multiple access scheme in downlink and uplink.

The following is a brief description of a frame structure of an IEEE 802.16m system which is an exemplary mobile communication system.

Figure 1:
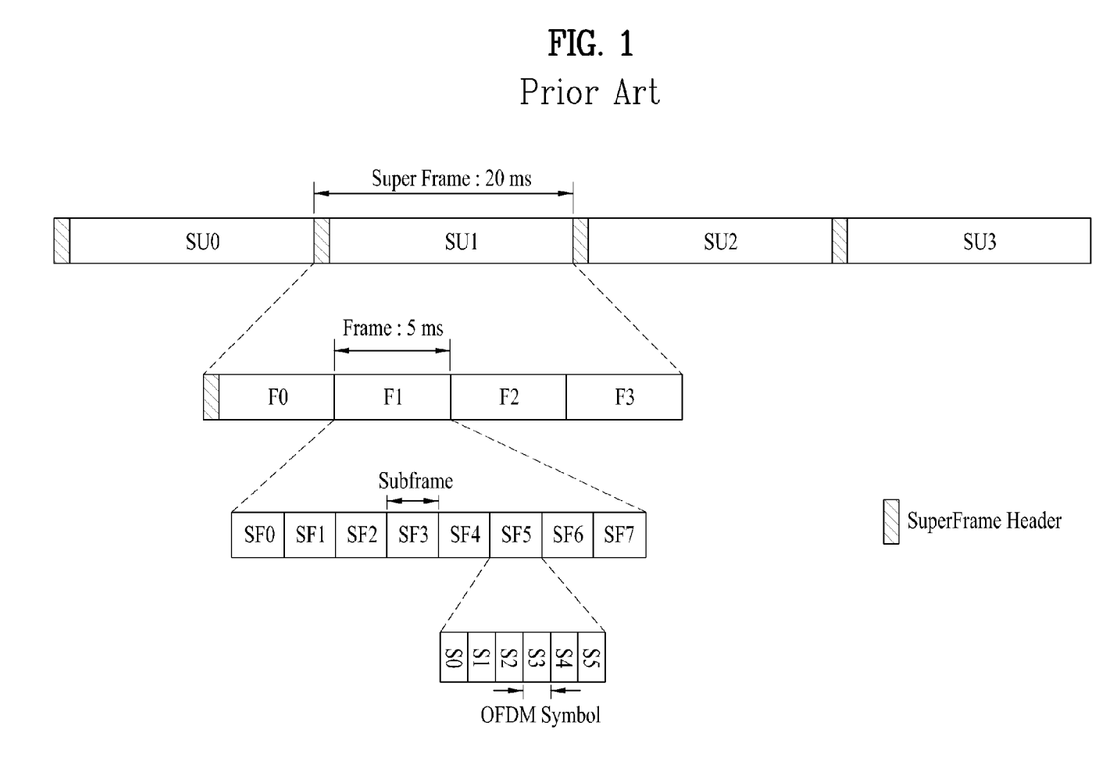
FIG. 1 illustrates a basic frame structure in an IEEE 802.16m system.

FIG. 1 illustrates a basic frame structure in an IEEE 802.16m system.

As shown in FIG. 1, each 20 ms superframe is divided into four 5 ms radio frames having the same size and starts at a SuperFrame Header (SFH). When one of the channel bandwidths of 5 MHz, 10 MHz, and 20 MHz is used, each 5 ms radio frame includes 8 subframes. One subframe may be allocated for downlink or uplink transmission.

The IEEE 802.16m system, which is an exemplary mobile communication system, uses three or more types of subframes. A type-1 subframe includes 6 OFDMA symbols, a type-2 subframe includes 7 OFDMA symbols, a type-3 subframe includes 5 OFDMA symbols.

The basic frame structure is applicable to both the FDD scheme, including the H-FDD MS operation scheme, and the TDD scheme. The number of switching points in each radio frame in the TDD system is 2. The switching points may be defined according to directionality changes from downlink to uplink or from uplink to downlink.

The H-FDD Mobile Station (MS) may be included in an FDD system, and a frame structure for the H-FDD MS is similar to a TDD frame structure. However, in the FDD system, downlink and uplink transmission are performed in two separate frequency bands. Transmission and reception circuits need to be switched in transmission gaps between downlink and uplink transmissions and between downlink and uplink transmissions.

Frame structures having a CP length corresponding to ⅛ of an effective symbol length Tb for a channel bandwidth of 7 MHz, other than the basic frame structure of the IEEE 802.16m system, have yet to be suggested.

SUMMARY OF THE INVENTION

An object of the present invention devised to solve the problem lies on an apparatus for transmitting and receiving signals using a frame structure in a wireless communication system.

Another object of the present invention devised to solve the problem lies on a method for transmitting and receiving signals using a frame structure in a wireless communication system.

Objects of the present invention are not limited to those described above and other objects will be clearly understood by those skilled in the art from the following description.

The object of the present invention can be achieved by providing an apparatus for transceiving signals using a predetermined frame structure in a wireless communication system, the apparatus including a Radio Frequency (RF) unit for transceiving a signal through a frame according to the predetermined frame structure, wherein the frame includes 5 subframes, the 5 subframes comprise type-1 subframes including 6 Orthogonal Frequency Division Multiplex Access (OFDMA) symbols and type-2 subframes including 7 OFDMA symbols, wherein a Cyclic Prefix (CP) length of the frame corresponds to ⅛ of an effective symbol length.

The frame may be a Time Division Duplex (TDD) frame or a Frequency Division Duplex (FDD) frame.

The TDD frame may include 2 type-1 subframes and 3 type-2 subframes.

The TDD frame may include a downlink interval and an uplink interval subsequent to the downlink interval and a Transmit Transition Gap (TTG) interval may be located between the downlink interval and the uplink interval and a Receive Transition Gap (RTG) interval may be located subsequent to a last subframe of the uplink interval.

A ratio of a number of downlink subframes to a number of uplink subframes in the TDD frame may be 3:2 or 2:3.

The TDD frame may include 2 type-1 subframes and 3 type-2 subframes.

Preferably, a symbol allocated to the TTG or RTG interval is located at a first symbol of a first uplink subframe of the TDD frame. Here, the first uplink subframe of the TDD frame may have 7 symbols, but one symbol of the first uplink subframe of the TDD frame is allocated to a transition gap. Therefore, the first uplink subframe of the TDD frame Type-1 subframe including 6 symbols.

The frame may have a channel bandwidth of 7 MHz and the TDD frame may include 33 OFDMA symbols and the FDD frame may include 34 OFDMA symbols.

In another aspect of the present invention, provided herein is a method for transmitting and receiving signals using a predetermined frame structure in a wireless communication system, the method including transceiving a signal through a frame according to the predetermined frame structure, wherein the frame includes subframes, the 5 subframes comprise type-1 subframes including 6 Orthogonal Frequency Division Multiplex Access (OFDMA) symbols and type-2 subframes including 7 OFDMA symbols, wherein a Cyclic Prefix (CP) length of the frame corresponds to ⅛ of an effective symbol length.

The frame may be a Time Division Duplex (TDD) frame or a Frequency Division Duplex (FDD) frame.

The TDD frame may include 2 type-1 subframes and 3 type-2 subframes.

The TDD frame may include a downlink interval and an uplink interval subsequent to the downlink interval and a Transmit Transition Gap (TTG) interval may be located between the downlink interval and the uplink interval and a Receive Transition Gap (RTG) interval may be located next to a last subframe of the uplink interval.

A ratio of a number of downlink subframes to a number of uplink subframes in the TDD frame may be 3:2 or 2:3.

Preferably, a symbol allocated to the TTG or RTG interval is located at a first symbol of a first uplink subframe of the TDD frame. Here, the first uplink subframe of the TDD frame may have 7 symbols, but one symbol of the first uplink subframe of the TDD frame is allocated to a transition gap. Therefore, the first uplink subframe of the TDD frame Type-1 subframe including 6 symbols.

The frame may have a channel bandwidth of 7 MHz and the TDD frame may include 33 OFDMA symbols and the FDD frame may include 34 OFDMA symbols.

According to the present invention, it is possible to efficiently transmit and receive signals using a frame structure having a CP length corresponding to ⅛ of an effective symbol length for a channel bandwidth of 7 MHz.

In addition, it is possible to efficiently transmit and receive signals using a frame structure, which has a CP length corresponding to ⅛ of an effective symbol length and which is designed to coexist with frame structures having other CP lengths according to the present invention, without causing collision and interference with frame structures having other CP lengths.

Advantages of the present invention are not limited to those described above and other advantages will be clearly understood by those skilled in the art from the following description.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following descriptions will be given in detail with reference to the case where the mobile communication system is a 3rd Generation Partnership Project Long Term Evolution (3GPP LTE) system, the following descriptions, except those specific to 3GPP LTE, may be applied to any other mobile communication system.

In some instances, known structures and devices are omitted or shown in block diagram form, focusing on important features of the structures and devices, so as not to obscure the concept of the present invention. The same reference numbers will be used throughout this specification to refer to the same or like parts.

In the following description, the term "Mobile Station (MS)" is used to generally describe any mobile or stationary user device such as a User Equipment (UE) or an Advance Mobile Station (AMS). In addition, the term "Base Station (BS)" is used to generally describe any network node that communicates with the MS such as a Node B, an eNode B, or an Access Point (AP).

In a mobile communication system, an MS may receive information from a BS in downlink and may transmit information to the BS in uplink. Information transmitted or received by the MS includes data and various control information. Various physical channels are provided according to types and purposes of information transmitted or received by the MS.

In the 3GPP LTE system, which is an example of the mobile communication system, Orthogonal Frequency Division Multiplexing (OFDM) is used as a multicarrier modulation scheme. The following is a brief description of the basic principle of the OFDM scheme.

In the OFDM system, a high rate data stream is divided into a large number of low rate data streams to simultaneously transmit the low rate data streams using a plurality of carriers. Each of the plurality of carriers is referred to as a "subcarrier". Since orthogonality exists between the subcarriers in the OFDM system, it is possible for a receiving side to detect the subcarriers even when frequency components of the subcarriers overlap each other. A high rate data stream may be converted into a plurality of parallel low rate data streams through a serial-to-parallel converter and the parallel low rate data streams may be multiplied by respective subcarriers and then combined and transmitted to the receiving side.

The parallel data streams generated by the serial-to-parallel converter may be transmitted through a plurality of subcarriers using an Inverse Discrete Fourier Transform (IDFT). The IDFT may be efficiently implemented using an Inverse Fast Fourier Transform (IFFT). The relative signal dispersion of each of the low rate subcarriers in the time domain, which is caused by multipath delay spread, is decreased since the symbol duration of each low rate subcarrier is increased.

A guard interval longer than the channel delay spread may be inserted between OFDM symbols to reduce Inter-symbol interference in wireless communication using the OFDM scheme. Specifically, a guard interval longer than the maximum channel delay spread is inserted between consecutive symbols while each symbol is transmitted through multipath channels. Here, a signal in a last part (i.e., in a guard interval) of the effective symbol duration of a symbol is copied and inserted at the beginning of the symbol to prevent loss of orthogonality between subcarriers. This inserted portion is referred to as a "Cyclic Prefix (CP)".

Figure 2:
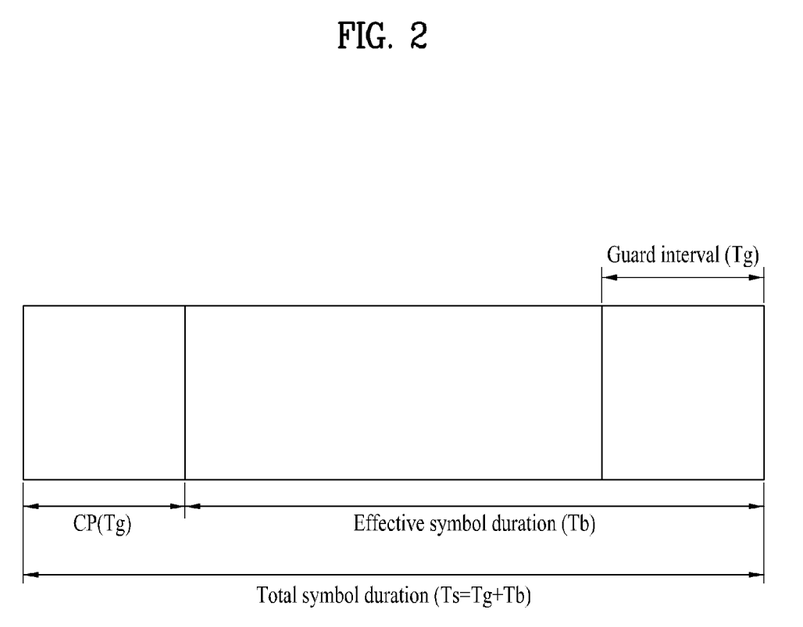
FIG. 2 illustrates an example of a symbol structure including a Cyclic Prefix (CP).

FIG. 2 illustrates an example of a symbol structure including a Cyclic Prefix (CP).

Referring to FIG. 2, a symbol period Ts is the sum of a guard interval Tg and an effective symbol duration Tb for carrying data. The receiving side demodulates a symbol by removing a guard interval Tg of the symbol and extracting data from an effective symbol duration thereof. The transmitting side and the receiving side can achieve synchronization and maintain orthogonality between data symbols using a CP code. The term "symbol" as used in the present invention may refer to an OFDMA symbol.

Figure 3:
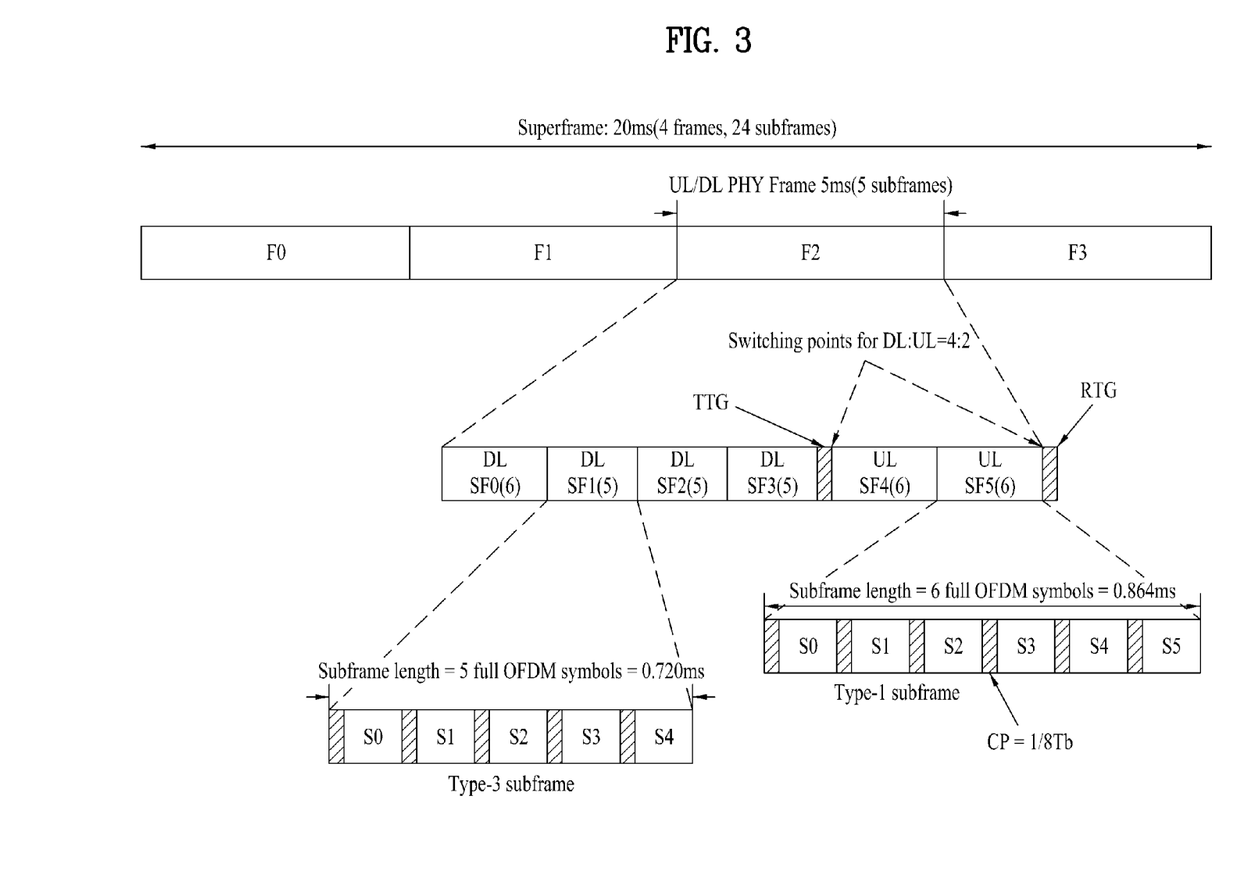
FIG. 3 illustrates an exemplary TDD frame structure which has a CP length corresponding to ⅛ of the effective symbol length Tb for a channel bandwidth of 7 MHz in an IEEE 802.16m system which is an exemplary mobile communication system.

FIG. 3 illustrates an exemplary TDD frame structure which has a CP length corresponding to ⅛ of the effective symbol length Tb for a channel bandwidth of 7 MHz in an IEEE 802.16m system which is an exemplary mobile communication system.

As shown in FIG. 3, in the exemplary TDD frame structure, a ratio of the number of downlink subframes to the number of uplink subframes in one frame may be 4:2. The TDD frame may have a channel bandwidth of 7 MHz and may have a CP length corresponding to ⅛ of the effective symbol length Tb.

Among 6 subframes included in one frame, 3 subframes may be type-1 subframes, each including 6 symbols, and the 3 remaining subframes may be type-3 subframes, each including 5 symbols. Here, the second, third, and fourth subframes which are arranged in temporal order in one frame may be type-3 subframes.

As can be seen from FIG. 3, the length of a Transmit Transition Gap (TTG) located at the time of downlink to uplink transition may be 188 μs and the length of a Receive Transition Gap (RTG) located at the time of uplink to downlink transition may be 60 μs.

Figure 4:
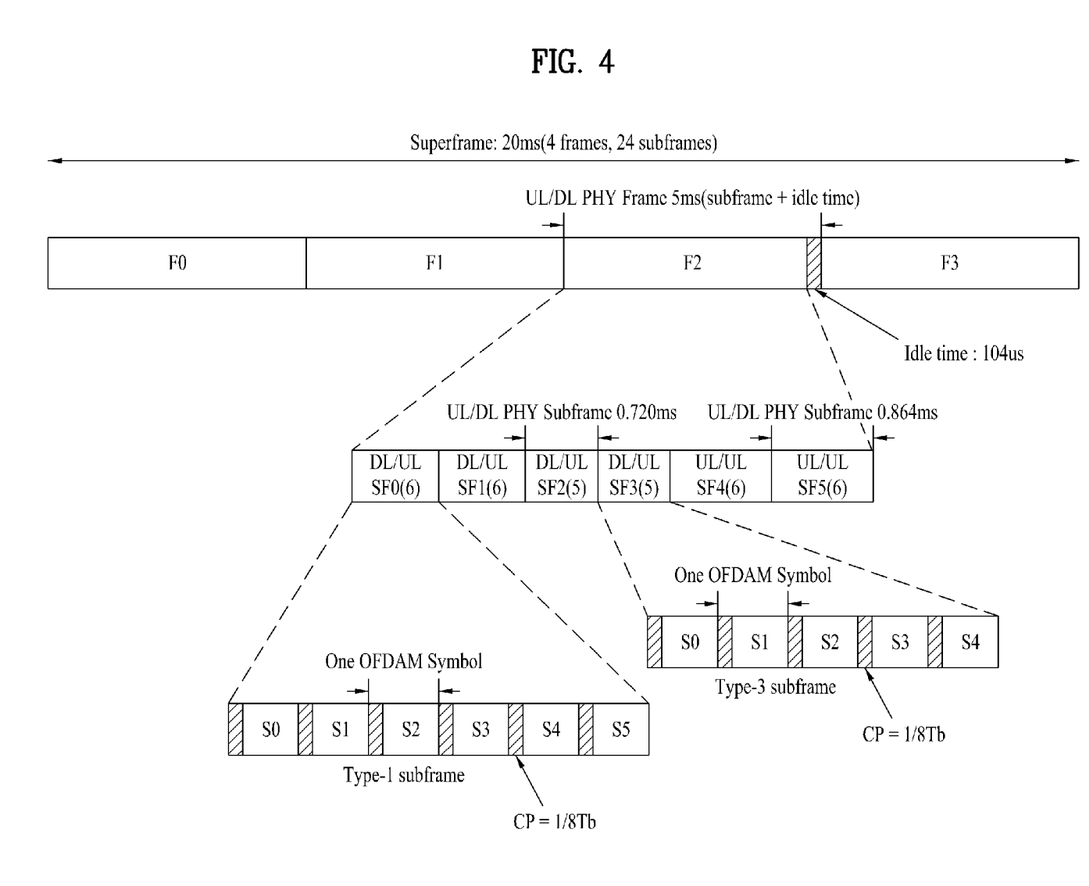
FIG. 4 illustrates an exemplary FDD frame structure which has a CP length corresponding to ⅛ of the effective symbol length Tb for a channel bandwidth of 7 MHz in an IEEE 802.16m system which is an exemplary mobile communication system.

FIG. 4 illustrates an exemplary FDD frame structure which has a CP length corresponding to ⅛ of the effective symbol length Tb for a channel bandwidth of 7 MHz in an IEEE 802.16m system which is an exemplary mobile communication system.

As shown in FIG. 4, in the exemplary FDD frame structure, the FDD frame may have a channel bandwidth of 7 MHz and may have a CP length corresponding to ⅛ of the effective symbol length Tb.

Among 6 subframes included in one frame, 4 subframes may be type-1 subframes, each including 6 symbols, and the 2 remaining subframes may be type-3 subframes, each including 5 symbols. Here, the second, third, and fourth subframes which are arranged in temporal order in one frame may be type-3 subframes.

As described above, each of the TDD and FDD frame structures shown respectively in FIGS. 3 and 4, which has a CP length corresponding to ⅛ of the effective symbol length Tb for a channel bandwidth of 7 MHz, may include type-1 subframes, each including 6 symbols, and type-3 subframes, each including 5 symbols. Accordingly, the frame structure, which has a CP length corresponding to ⅛ of the effective symbol length Tb for a channel bandwidth of 7 MHz as shown in FIGS. 3 and 4, requires a new type of uplink control channel including 5 symbols in the uplink region since the frame structure includes type-3 subframes. However, it is difficult to smoothly transmit control information using the frame structure shown in FIGS. 3 and 4 since the current control channel consists of type-1 subframes alone.

The following Table 1 illustrates OFDMA parameters applied to the IEEE 802.16m system which is an exemplary mobile communication system.

TABLE 1

|  |  |  | The nominal channel bandwidth, BW (MHz) | | | | |
| --- | --- | --- | --- | --- | --- | --- | --- |
|  |  |  | 5 | 7 | 8.75 | 10 | 20 |
| Sampling factor, n |  |  | 28/25 | 8/7 | 8/7 | 28/25 | 28/25 |
| Sampling frequency, $F_s$ (MHz) |  |  | 5.6 | 8 | 10 | 11.2 | 22.4 |
| FFT size, $N_{FFT}$ |  |  | 512 | 1024 | 1024 | 1024 | 2048 |
| Subcarrier spacing, Δf (kHz) |  |  | 10.94 | 7.81 | 9.77 | 10.94 | 10.94 |
| Useful symbol time, $T_b$ (μs) |  |  | 91.4 | 128 | 102.4 | 91.4 | 91.4 |
| CP ratio, G = ⅛ | OFDMA symbol time, $T_s$ (μs) |  | 102.857 | 144 | 115.2 | 102.857 | 102.857 |
|  | FDD | Number of OFDMA symbols per 5 ms frame | 48 | 34 | 43 | 48 | 48 |
|  | TDD | Idle time (μs) | 62.857 | 104 | 46.40 | 62.857 | 62.857 |
|  |  | Number of OFDMA symbols per 5 ms frame | 47 | 33 | 42 | 47 | 47 |
|  |  | TTG + RTG (μs) | 165.714 | 248 | 161.6 | 165.714 | 165.714 |
| CP ratio, G = 1/16 | OFDMA symbol time, $T_s$ (μs) |  | 97.143 | 136 | 108.8 | 97.143 | 97.143 |
|  | FDD | Number of OFDMA symbols per 5 ms frame | 51 | 36 | 45 | 51 | 51 |
|  | TDD | Idle time (μs) | 45.71 | 104 | 104 | 45.71 | 45.71 |
|  |  | Number of OFDMA symbols per 5 ms frame | 50 | 35 | 44 | 50 | 50 |
|  |  | TTG + RTG (μs) | 142.853 | 240 | 212.8 | 142.853 | 142.853 |
| CP ratio, G = ¼ | OFDMA symbol time, $T_s$ (μs) |  | 114.286 | 160 | 128 | 114.286 | 114.286 |
|  | FDD | Number of OFDMA symbols per 5 ms frame | 43 | 31 | 39 | 43 | 43 |
|  |  | Idle time (μs) | 85.694 | 40 | 8 | 85.694 | 85.694 |
|  | TDD | Number of OFDMA symbols per 5 ms frame | 42 | 30 | 37 | 42 | 42 |
|  |  | TTG + RTG (μs) | 199.98 | 200 | 264 | 199.98 | 199.98 |

The following Table 2 illustrates additional OFDMA parameters other than those of Table 1.

TABLE 2

|  |  | The nominal channel bandwidth, BW (MHz) | | | | |
| --- | --- | --- | --- | --- | --- | --- |
|  |  | 5 | 7 | 8.75 | 10 | 20 |
| Number of guard sub-carriers | Left | 40 | 80 | 80 | 80 | 160 |
|  | Right | 39 | 79 | 79 | 79 | 159 |
| Number of used sub-carriers | | 433 | 865 | 865 | 865 | 1729 |
| Number of physical resource unit (18 × 6) in a type-1 AAI subframe. | | 24 | 48 | 48 | 48 | 96 |

Frame structures (TDD and FDD frame structures) in the IEEE 802.16m system, each of which has a CP length corresponding to ⅛ of the effective symbol length Tb (i.e., a CP length of ⅛ Tb) for a channel bandwidth of 7 MHz in an IEEE 802.16m system which is an exemplary mobile communication system, are described below.

In addition, TDD frame structures suggested in the present invention, which may coexist with TDD frame structures having a CP length of ⅛ Tb or a CP length of 1/16 Tb for the same channel bandwidth of 7 MHz, are described below. FDD frame structures that have a number of features in common with the TDD frame structures suggested in the present invention are also described below.

The TDD and FDD frame structures of the IEEE 802.16m system having a CP length of ⅛ Tb for the 7 MHz channel bandwidth suggested in the present invention have the OFDMA parameters defined in the above Tables 1 and 2. The frame structures of the IEEE 802.16m system having a CP length of ⅛ Tb for the 7 MHz channel bandwidth suggested in the present invention have features in common with the basic frame structures and may coexist with frame structures having other CP lengths (for example, a CP length of 1/16 Tb for the 7 MHz channel bandwidth). The frame structures of the IEEE 802.16m system having a CP length of ⅛ Tb for the 7 MHz channel bandwidth suggested in the present invention may be constructed such that their boundaries (or transition points) between uplink and downlink do not overlap those of frame structures having other CP lengths. Accordingly, the frame structures of the IEEE 802.16m system having a CP length of ⅛ Tb for the 7 MHz channel bandwidth suggested in the present invention do not interfere with frame structures having other CP lengths and therefore may coexist with frame structures having other CP lengths.

Figure 5:
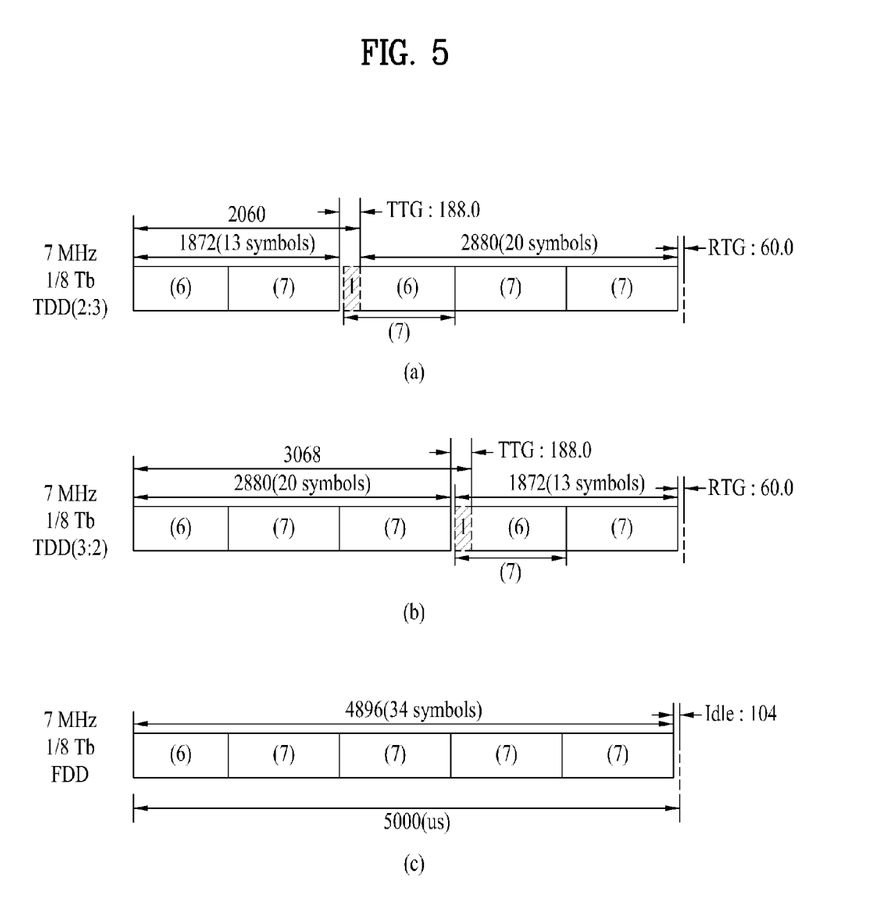
FIG. 5 illustrates exemplary frame structures of the IEEE 802.16m system having a CP length of ⅛ Tb for a channel bandwidth of 7 MHz according to the present invention.

FIG. 5 illustrates exemplary frame structures of the IEEE 802.16m system having a CP length of ⅛ Tb for a channel bandwidth of 7 MHz according to the present invention.

TDD and FDD frame structures shown in FIGS. 5(a) to (c) use OFDMA parameters shown in Tables 1 and 2. As shown in Tables 1 and 2, OFDMA parameters "symbol duration", "TTG", and "RTG" defined when frame structure with a CP length of ⅛ Tb is used for the 7 MHz channel bandwidth are 144 µs, 188 µs, and 60 µs, respectively.

FIGS. 5(a) and (b) illustrate TDD frame structures of the IEEE 802.16m system having a CP length of ⅛ Tb for the 7 MHz channel bandwidth. As shown in FIGS. 5(a) and (b), a ratio of the number of downlink subframes to the number of uplink subframes in a TDD frame including 5 subframes may be 2:3 or 3:2.

As shown in FIGS. 5(a) and (b), a TDD frame may be constructed of subframes including type-1 subframes, each including 6 OFDMA symbols, and type-2 subframes, each including 7 OFDMA symbols, so as not to create a control channel constructed 5 OFDMA symbols in the uplink region.

Taking into consideration the defined OFDMA parameters, it can be seen that the number of OFDMA symbols included in one FDD frame when a CP length of ⅛ Tb is used in the FDD frame is 34. However, a TDD frame having a CP length of ⅛ Tb for a channel bandwidth of 7 MHz according to the present invention requires TTG/RTG intervals for switching between downlink and uplink. Accordingly, one symbol may be allocated to the TTG/RTG. The number of symbols of a TDD frame is 33, which is one less than the number of symbols of an FDD frame, since one symbol is allocated to the TTG/RTG in the TDD frame.

One TDD frame may include 5 subframes. Specifically, one TDD frame may include 2 type-1 subframes and 3 type-2 subframes. TTG/RTG intervals may be allocated to the first uplink subframe in the TDD frame. To accomplish this, a type-2 subframe may be located at the first uplink subframe position. One symbol allocated to the TTG/RTG intervals is located at the first symbol position of the first uplink subframe. The first uplink subframe has substantially the same format as the type-1 subframe structure since one symbol of the type-2 subframe at the first uplink subframe position is allocated to TTG/RTG intervals.

As shown in FIGS. 5(a) and (b), type-1 subframes may be located only at the first downlink subframe position and the first uplink subframe position in a TDD frame. The number of symbols allocated to downlink and the number of symbols allocated to uplink in the TDD frame structure may be expressed by 6+7*(M−1), where M is the number of subframes allocated to downlink, and 6+7*(N−1), where N is the number of subframes allocated to uplink, respectively.

As shown in the FDD frame of FIG. 5(c), the number of symbols in the FDD frame is 34 since the FDD frame does not require the TTG/RTG. The FDD frame may be constructed of type-1 subframes, each including 6 OFDMA symbols, and type-2 subframes, each including 7 OFDMA symbols, from among basic subframes, so as not to create an uplink control channel constructed 5 OFDMA symbols in the uplink region. In this case, one FDD frame includes 5 subframes.

One FDD frame having a CP length of ⅛ Tb for a channel bandwidth of 7 MHz according to the present invention may be constructed of 34 OFDMA symbols and may be constructed of 5 subframes. One FDD frame may also be constructed of one type-1 subframe and four type-2 subframes. Here, one type-1 subframe may be located in the FDD frame at the subframe position that is first in temporal order.

Figure 6:
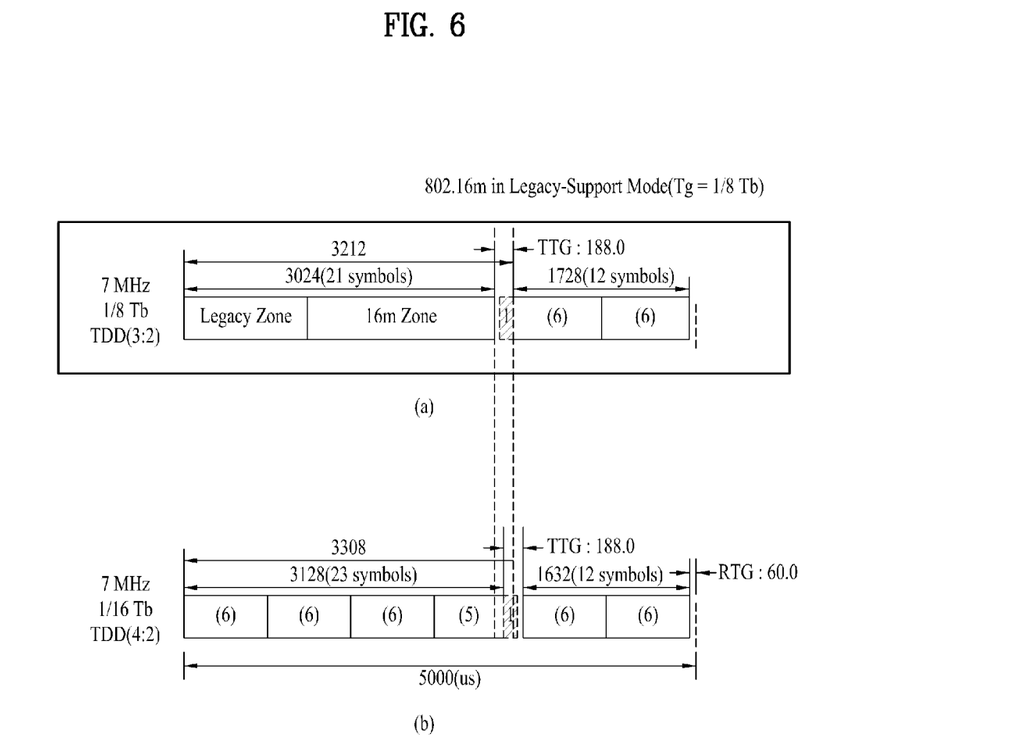
FIG. 6 illustrates an exemplary TDD frame structure that supports a legacy mode.

FIG. 6 illustrates an exemplary TDD frame structure that supports a legacy mode.

A legacy system is a conventional system that complies with conventional standards. The IEEE 802.16e system is one example of a legacy system. However, the legacy system is not limited to the IEEE 802.16e system. A new system which has evolved from the conventional system may be installed in an area where the legacy system is installed. In this case, the new system needs to support not only the legacy MS but also new MSs. FIG. 6 illustrates a TDD frame structure defined to support the legacy mode in the IEEE 802.16m system.

As shown in FIG. 6(a), 12 symbols need to be allocated to the uplink region in order to support the legacy system. In addition, an interval for downlink to uplink transition needs to be located at the first uplink subframe. That is, a TTG may be located at the first uplink subframe.

As shown in FIG. 6(a), the first uplink subframe may be considered a type-2 subframe since the first uplink subframe includes a total of 7 OFDMA symbols including an idle interval. However, the first uplink subframe may substantially be assumed to be a type-1 subframe including 6 symbols since one symbol of the first uplink subframe is reserved to create a transition interval (or a delay interval) required for the TTG in the TDD frame. That is, by allocating an idle interval for the TTG in the uplink region, the frame structure shown in FIG. 6(a) can sufficiently support the legacy system and can also coexist with frame structures having other CP lengths for the same channel bandwidth as shown in FIG. 6(b) without interference therebetween. The frame structure suggested so as not only to support the legacy system but also to coexist with frame structures having other CP lengths as described above can be applied, regardless of the ratio between the number of downlink subframes and the number of uplink subframes.

As described above, a TDD frame structure shown in FIG. 6(a) can coexist with legacy-mode frame structures having other CP lengths for the same channel bandwidth (for example, 7 MHz) without interference therebetween.

In summary, using the frame structures shown in FIGS. 5 and 6, a signal transceiver (i.e., an MS or a BS) can efficiently transmit and receive signals and can also efficiently transmit and receive signals to and from a signal transceiver, which uses other CP lengths, without interference and collision therebetween.

Figure 7:
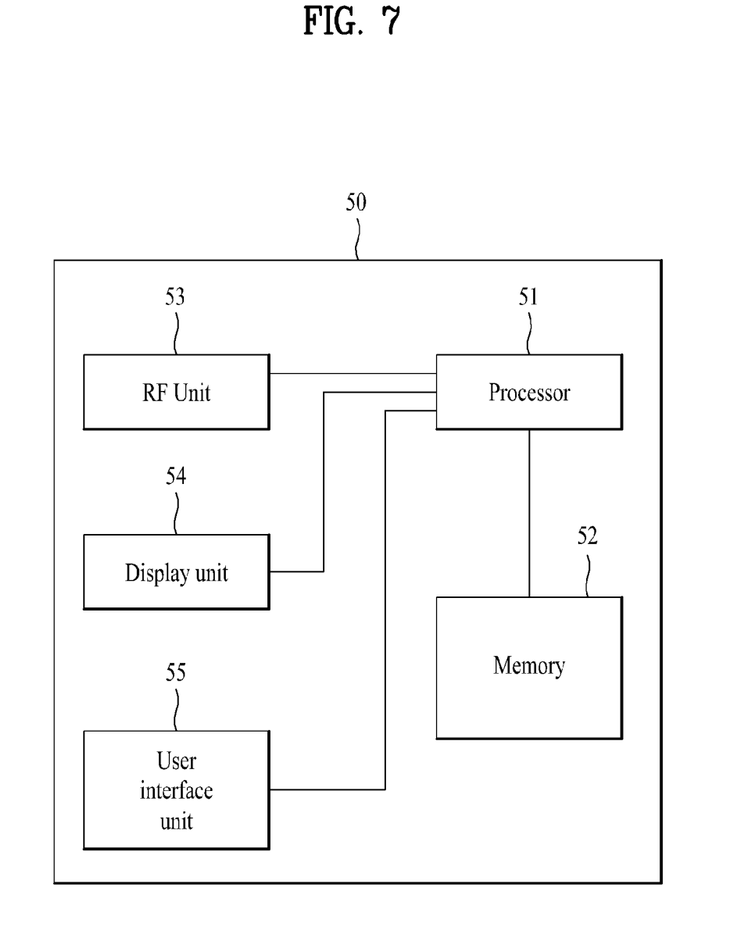
FIG. 7 is a block diagram illustrating components of a signal transceiver according to the present invention.

FIG. 7 is a block diagram illustrating components of a signal transciever 50 according to the present invention.

As shown in FIG. 7, the signal transciever 50 may be an MS or a BS. The signal transciever 50 includes a processor 51, a memory 52, a Radio Frequency (RF) unit 53, a display unit 54, and a user interface unit 55.

Layers of a radio interface protocol are implemented in the processor 51. The processor 51 provides a control plane and a user plane. Functions of the layers may be implemented in the processor 51. The memory 52 is connected to the processor 51 to store an operating system, applications, and general files.

The display unit 54 displays a variety of information and may include a well known element such as a Liquid Crystal Display (LCD) or an Organic Light Emitting Diode (OLED).

The user interface unit 55 may include a combination of well known user interfaces such as a keypad and a touch screen.

The RF unit 53 may be connected to the processor 51 to transmit and receive radio signals. The RF unit 53 may be divided into a transmission module (not shown) and a reception module (not shown).

The layers of the radio interface protocol between an MS and a network can be classified into a first layer L1, a second layer L2 and a third layer L3 based on the three lower layers of an Open System Interconnection (OSI) reference model widely known in the field of communications. A physical layer belonging to the first layer L1 provides an information transfer service using a physical channel. A Radio Resource Control (RRC) layer located at the third layer provides radio resources for control between the MS and the network. The MS and the network exchange RRC messages through the RRC layer.

Various embodiments have been described in the best mode for carrying out the invention.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention can be implemented by hardware, firmware, software, or any combination thereof. In the case where the present invention is implemented by hardware, the method for transmitting and receiving signals using a predetermined frame structure according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

The invention claimed is:

1. A method for transceiving signals in a wireless communication system, the method comprising:
transceiving a signal through a frame,
wherein the frame consists of 5 subframes, the 5 subframes comprise at least one type-1 subframe and at least one type-2 subframe, each of the at least one type-1 subframe consists of 6 Orthogonal Frequency Division Multiplex Access (OFDMA) symbols and each of at least one type-2 subframe consists of 7 OFDMA symbols,
wherein a Cyclic Prefix (CP) length of the frame corresponds to $\frac{1}{8}$ of an effective symbol length,
wherein a first subframe is located at a beginning of the frame and a second subframe is located next to the first subframe, and
wherein the first subframe of the frame is a type-1 subframe and the second subframe of the frame is a type-2 subframe.

2. The method according to claim 1, wherein the frame is a Time Division Duplex (TDD) frame or a Frequency Division Duplex (FDD) frame.

3. The method according to claim 2, wherein the frame is a TDD frame and the TDD frame includes 2 type-1 subframes and 3 type-2 subframes.

4. The method according to claim 3, wherein the TDD frame includes a downlink interval and an uplink interval subsequent to the downlink interval and a Transmit Transition Gap (TTG) interval is located between the downlink interval and the uplink interval and a Receive Transition Gap (RTG) interval is located next to a last subframe of the uplink interval.

5. The method according to claim 3, wherein a ratio of a number of downlink subframes to a number of uplink subframes in the TDD frame is 3:2 or 2:3.

6. The method according to claim 2, wherein the frame has a channel bandwidth of 7 MHz.

7. The method according to claim 2, wherein the TDD frame includes 33 OFDMA symbols and the FDD frame includes 34 OFDMA symbols.

8. The method according to claim 2, wherein a third subframe is located next to the second subframe and the third subframe is a type-2 subframe.

9. The method according to claim 8, wherein a fourth subframe is located next to the third subframe, and
wherein the fourth subframe of the TDD frame is a type-1 subframe and the fourth subframe of the FDD frame is a type-2 subframe.

10. The method according to claim 1, wherein a last subframe is a type-2 subframe.

11. An apparatus for transceiving signals in a wireless communication system, the apparatus comprising:
a Radio Frequency (RF) unit; and
a processor,
wherein the processor is configured to cause:
the RF unit to transceive a signal through a frame,
wherein the frame consists of 5 subframes, the 5 subframes comprise at least one type-1 subframes and at least one type-2 subframe, each of the at least one type-1 subframe consists of 6 Orthogonal Frequency Division Multiplex Access (OFDMA) symbols and each of the at least one 7 OFDMA symbols,
wherein a Cyclic Prefix (CP) length of the frame corresponds to $1/8$ of an effective symbol length,
wherein a first subframe is located at a beginning of the frame and a second subframe is located next to the first subframe, and
wherein the first subframe of the frame is a type-1 subframe and the second subframe of the frame is a type-2 subframe.

12. The apparatus according to claim 11, wherein the frame is a Time Division Duplex (TDD) frame or a Frequency Division Duplex (FDD) frame.

13. The apparatus according to claim 12, wherein the frame is a TDD frame and the TDD frame includes 2 type-1 subframes and 3 type-2 subframes.

14. The apparatus according to claim 13, wherein the TDD frame includes a downlink interval and an uplink interval subsequent to the downlink interval and a Transmit Transition Gap (TTG) interval is located between the downlink section and the uplink interval and a Receive Transition Gap (RTG) interval is located next to a last subframe of the uplink interval.

15. The apparatus according to claim 13, wherein a ratio of a number of downlink subframes to a number of uplink subframes in the TDD frame is 3:2 or 2:3.

* * * * *